Nov. 19, 1968    M. STAUNT    3,411,212

DENTAL HANDPIECES

Original Filed Jan. 16, 1961    7 Sheets-Sheet 1

Nov. 19, 1968  M. STAUNT  3,411,212
DENTAL HANDPIECES
Original Filed Jan. 16, 1961

United States Patent Office 3,411,212
Patented Nov. 19, 1968

3,411,212
DENTAL HANDPIECES
Martin Staunt, Des Plaines, Ill., assignor, by mesne assignments, to American Hospital Supply Corporation, Evanston, Ill., a corporation of Illinois
Continuation of application Ser. No. 82,872, Jan. 16, 1961, which is a continuation-in-part of application Ser. No. 620,434, Nov. 5, 1956. This application Mar. 4, 1963, Ser. No. 264,470
The portion of the term of the patent subsequent to June 19, 1978, has been disclaimed
24 Claims. (Cl. 32—27)

ABSTRACT OF THE DISCLOSURE

Contra-angle dental handpiece constructions wherein a cartridge assembly including drive means for the handpiece is removably mounted by clamping the outer ball bearing races thereof in place within the cylindrical chamber of the housing.

---

The present application is a continuation of my copending application Ser. No. 82,872, filed Jan. 16, 1961, now abandoned, which in turn is a continuation-in-part of my prior applications: Ser. No. 833,412, filed Aug. 13, 1959—Dental Handpieces, now Patent No. 3,050,856, issued Aug. 28, 1962; Ser. No. 620,434, filed Nov. 5, 1956—Dental Handpieces, now Patent No. 2,988,815, issued June 20, 1961; Ser. No. 789,751, filed Jan. 28, 1959—Air Driven Dental Handpieces, now Patent No. 3,084,439, issued Apr. 9, 1963.

One of the objects of the present invention is the provision of an improved bearing structure for dental handpieces, including ball bearings, which is directed primarily to the structure of the rotor assembly of the handpiece to render the same easily mountable within and removable from the housing of the head of the handpiece.

Another object of the invention is the provision of an improved ball bearing structure for dental handpieces which is equally adaptable for use in gear driven contra angle handpieces and air driven contra angle handpieces.

Another object of the invention is the provision of an improved cartridge casing for the rotating shaft assembly in which the casing engages the outer races of the ball bearing units in such manner that the ball bearing outer races are accurately spaced in alignment with their respective inner races, and in which the head housing is adapted to hold the outer races accurately concentric with the inner races and with the shaft so that the predetermined clearances which are provided for the balls of the bearing units are maintained, throughout the life of the bearings, and in which the shaft is adapted to rotate substantially without any vibration so as to reduce noise and discomfort to the patient and to assure the smooth action of the handpiece assembly.

Another object of the invention is the provision of improved ball bearing structures for dental handpieces in which the accurate axial and concentric location and maintenance of this position of the inner races is also assured, so that both the inner and outer races may be secured on the shaft and in the housing, respectively, by threaded clamping means acting on the races and other elements, which are of accurate axial length so that alignment and concentricity and the angular position of the race grooves relative to the axis of the shaft are assured and maintained during the life of the handpiece and bearings, which life is extended over the devices of the prior art by reason of this improved structure.

Another object of the invention is the provision of both gear driven and air driven ball bearing dental handpieces the structure of which facilitates the provision of a cartridge unit which may be removed and replaced, and which may be continuously lubricated by the passage of air carrying lubricant mist through the ball bearings between the races.

One of the objects of the invention is the provision of improved dental handpieces adapted to be operated at rotative speeds amounting to 50,000 r.p.m. or higher, and which will run cooler and more smoothly and also more quietly than the devices of the prior art.

Another object of the invention is the provision of improved dental handpieces with higher operating speeds, which will enable the dentists to accomplish their work with greater ease and speed, reducing the cavity preparation time to a fraction of that formerly required by the devices of the prior art.

Another object of the invention is the provision of improved dental handpieces which may be operated at lighter pressures and which will produce less vibration and reduce frictional heat, all of which contribute to the result of causing less trauma to the patient.

Another object of the invention is the provision of improved handpieces having improved bearings which are adapted to take the lateral and axial thrust that is placed upon them by use of the handpieces, and which operate more smoothly and with less vibration and noise, and at greater speeds than the devices of the prior art.

Other objects and advantages of the invention will be apparent from the following description and the accompanying drawings, in which similar characters of reference indicate similar parts throughout the several views.

Referring to the drawings, of which there are seven sheets.

Figures 1, 2, 3:
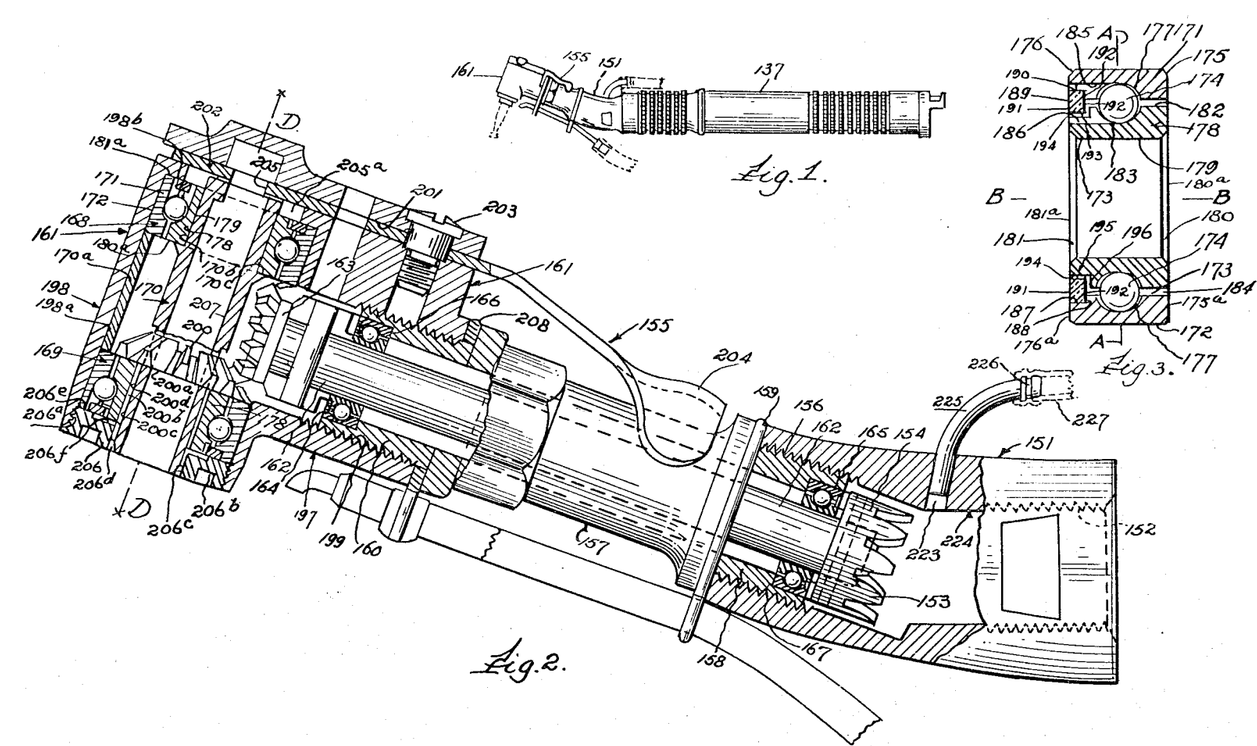
FIG. 1 is a side elevational view of an exemplary dental handpiece shown in full scale, said handpiece being of the gear driven type, provided with ball bearings and lubricant mist lubrication, with air being discharged about the tool shaft in the direction of the bur.
FIG. 2 is an enlarged sectional view taken on a plane passing through the axis of the handle and the axis of the head, showing the ball bearing and shaft assembly, which is removable as a cartridge unit from the head of the handpiece.
FIG. 3 is an axial sectional view taken through one of the ball bearing units shown in FIG. 2.
Figure 7:
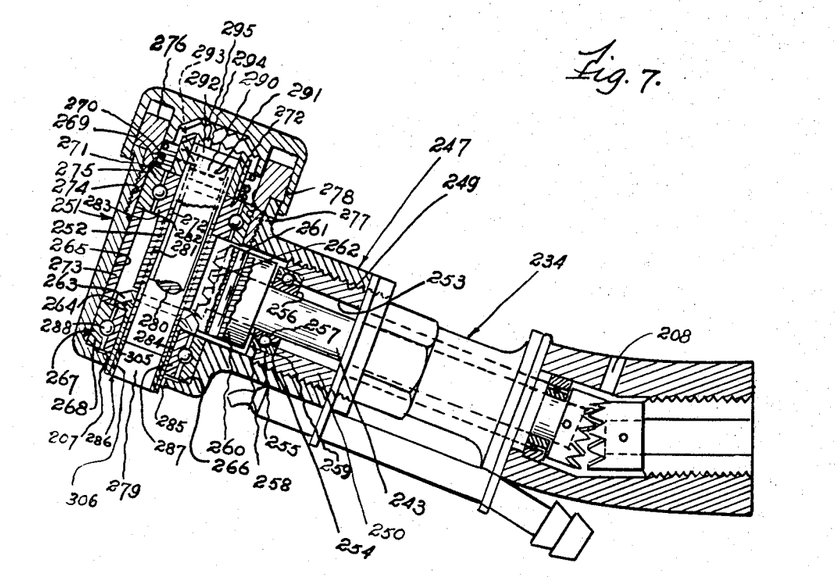
FIG. 7 is a similar view of another modified form of contra angle head.

Referring to FIG. 2, this is an enlarged drawing of the contra angle shown in FIG. 7 of my prior application Ser. No. 620,434, filed Nov. 5, 1956, which differs from FIG. 7 only in the fact that the ball bearings 168, 169, 164, 165, which are shown diagrammatically in FIG. 7 of said application, are now shown herein in detail according to FIG. 12 of said prior application, which figure is copied herein as FIG. 3.

FIG. 1 herein is a reproduction of FIG. 8 of said prior application.

The contra angle of FIG. 2 is indicated in its entirety by the numeral 155; and it includes a contra angle extension housing 151 having a threaded bore 152 for receiving a threaded plug carried by the handpiece 137, and having a gear adapted to extend into the contra angle extension housing in engagement with the gear 154.

The housing 151 provides an obtuse angle portion for supporting the contra angle 155 at the desired angle for operation and housing 151 has internal threads 156 at its opposite end.

Gears 153 and 154 have longitudinally extending teeth engaged only at one side by virtue of the angularity of the housing 151; and one of these gears is perferably of stainless steel, while the other is preferably of molded nylon, which also enables the drive of the contra angle at speeds of 50,000 r.p.m. or higher.

The angular housing 151 supports a tubular member 157 which has a reduced threaded portion 158 threaded into the threaded end 156. The reduced threaded portion 158 carries a flat metal plate 159 by means of a bore and plate 159 is clamped between the tubular member 157 and the end of the housing 151.

At its other end the tubular member 157 has a reduced threaded portion 160 to be threaded into the contra angle head 161 and a shaft 162 extends through the tubular member 157 and is provided with gear 154 at one end and with a bevel gear 163 at the other end.

These gears are pinned to shaft 162 and shaft 162 is rotatably supported at both of its ends by the ball bearing assemblies 164, 165, further to be described. Each of these ball bearing assemblies is mounted in a counterbore 166, 167 in the end of tubular member 157 and each has inner and outer races, further to be described, the outer race engaging in the counterbore 167 or 166, and the inner race supporting the shaft 162.

Referring to FIG. 3, this is an enlarged view showing the details of the ball bearings, which are preferably employed everywhere in this handpiece or contra angle where ball bearings are indicated. In particular, these ball bearings are employed in the contra angle head 161, where ball bearings are indicated at 168 and 169 on the tool shaft or rotatable member 170.

The ball bearing assemblies of FIG. 3 include an outer race 171, which may have a cylindrical outer surface 172 and a cylindrical bore 173. The balls used are indicated at 174 and these may be hardened steel balls.

The outer race 171 may have its corners chamfered at 175, 176 and it is provided with an inner ball groove 177, which is partially circular in cross section and on a radius slightly larger than the radius of the balls 174.

The inner race 178 comprises a hardened steel member like the outer race 171, having an inner cylindrical bore 179 with corners chamfered at 180, 181.

The inner race 178 has an outer cylindrical surface 182 and an inner ball groove 183 on its periphery, the groove being partially circular in cross section and on a radius slightly larger than the balls 174. Clearance between the races is indicated at 184.

At one end of the race assembly the races are provided with a loading opening comprising an axial groove 185 in the outer race 171 and an axial groove 186 in the inner race.

These loading openings formed by the two grooves 185, 186 are circular or cylindrical in shape and of slightly larger diameter than the balls 174 so that the balls may be moved into the race grooves 177 and 183 through the loading openings.

The outer race 171 has a counterbore of larger diameter at 187 in the end which has the loading opening and the counterbore terminates at an annular shoulder 188 adapted to provide a seat for a nylon or Teflon seal ring C.) and the 4-naphthylenesulfinic acid salt of aniline (mo-
189.

The seal ring 189 has an external cylindrical surface 190 and has plane ends 191 and 192 and an inner cylindrical surface 193, which comes very close to the outer cylindrical surface 194 on the reduced portion 195 of the inner race 178.

The clearance at 196 between the seal ring 189 and cylindrical surface 194 is reduced to a minimum without contact and this aids in excluding foreign matter from the interior of the races 178 and 171, but permits ventilation of these races by air pressure inside the contra angle housing.

Under some conditions the seal 189 may also be used for retaining heavy lubricant inside the ball bearing races. The seal 189 also closes the loading opening formed by grooves 185 and 186 and prevents the balls from jumping out into the loading opening.

The present ball bearing assemblies are installed by having their outer cylindrical surfaces 172 of the outer race in every case frictionally secured in a cylindrical bore and by having their inner cylindrical surface 179 of the inner race 178 frictionally secured on a reduced portion of a shaft against an annular shoulder, as shown in FIG. 2.

The end surfaces of the outer race 171 are indicated at 176a and 175a and these end surfaces of the outer race are perfectly plane surfaces at right angles to the central axis B of the ball bearing assembly and in the same plane as the end surfaces 180a and 181a of the inner race, which also are accurately at right angles to the axis B.

The inner cylindrical surfaces 179 of the inner race 178 are accurately concentric with the axis B and the race groove 183 on the inner race 178 is accurately concentric with the axis B.

The outer cylindrical surfaces 172 of each outer race 171 are accurately concentric with respect to the axis B and with respect to the outer race groove 177 and when assembled, the race grooves and the inner and outer cylindrical surfaces are accurately concentric with respect to axis B.

The axis A is the line of centers of the balls 174 and of the inner race groove 183 and the outer race groove 177 and this axis A and the race grooves are located equally distant from both of the end surfaces 175a and 176a of the outer race and the end surfaces 180a and 181a of the inner races.

Thus, when the bearing assembly is forced on a shaft by an end thrust on the ball bearing assembly with a tool having a plane end surface, the alignment of the inner and outer grooves 183, 177 on the axis A is preserved. Having the race grooves formed on a radius larger than the balls assures point contact between each ball and the inner race and between each ball and the outer race, reducing friction.

There is, of course, a very small clearance between the balls and the grooves of each race when properly aligned and there is sufficient clearance between the races and the balls to pass air carrying lubricant mist, as described hereinafter.

The same type of ball bearing assemblies shown in FIGURE 3 are employed in FIG. 2 in every case.

The contra angle head 161 comprises a housing member having a laterally extending tubular portion 197 at right angles to another tubular portion 198, these tubular portions communicating with each other. The tubular portion 197 has internal threads 199 receiving the threaded reduced portion of the tubular member 157 and permitting the bevel gear 163 to project into the tubular portion 197, where it engages the bevel gear 200 on the tool shaft 170.

One of these bevel gears is preferably stainless steel, while the other is of molded nylon, for the purpose of promoting a smoother operation at higher speeds.

The tubular body 197 has a lateral slot 201 for receiving the sheet metal tool shank securing member 202, which is pivotally mounted on the screw bolt 203 and has an axial extension with a curved portion 204 engaging the outside of tubular member 157 resiliently.

At its left end this tool shank securing member has a slot engaging about the grooved end of a tool shank at 205 for use with tool shanks of the prior art. The tool shaft 170 comprises a tubular member rotatably supported by the inner races of ball bearings 168 and 169.

As stated above, the ball bearing assemblies are installed in every case by having the inner cylindrical surfaces 179 of the inner race 178 frictionally secured on a reduced portion of a shaft against an annular shoulder, as shown in FIG. 2.

Thus the shaft 170 has a concentric outer cylindrical surface 170b which has a pressed fit against the inner cylindrical surface 179 of the upper inner race. Also, the shaft 170 has a concentric cylindrical bore 207 for receiving the tool shank of a bur.

The shaft 170 is also provided with an annular shoulder 170c which is accurately at right angles to the axis of the shaft, and against which the inner race 178 is accurately located with its end surface 180a engaging the annular shoulder 170c.

While in some embodiments the inner race may be held on the shaft solely by a pressed frictional fit, its permanent, definite location is preferably assured by using the annular shoulder 170c.

At its lower end the tool shaft 170 carries a bevel gear 200, which has an annular shoulder 200a on its lower side, engaging the upper surface 180a of the inner race 178 of the lower ball bearing assembly 169.

The annular shoulder 200a below the bevel gear is accurately at right angles to the axis of the shaft and the bevel gear 200 preferably has an integral tubular sleeve 200b having a cylindrical bore 200c and a cylindrical outer surface 200d, all of which are accurately concentric with the axis of the shaft.

The gear sleeve 200b has a pressed fit on the lower concentric reduced portion 170d of the shaft, which has concentric inner and outer cylindrical surfaces. Thus, the lower inner race 178 has a concentric pressed fit on the shaft, but is also preferably located against the annular shoulder 200a.

The tubular body 198 has a cylindrical bore 198a which is accurately concentric to the axis of the shaft 170, and it is provided with an annular shoulder 198b at its upper end. This shoulder is accurately at right angles to the axis of the shaft, and the end surface 181a of the outer race 171 of the upper ball bearing assembly is seated against the annular shoulder 198b.

The cylindrical bore 198a forms an annular seat for assuring the concentric location of the outer race in the assembly by engaging the outer cylindrical surface 172 of the upper ball bearing outer race.

A stainless steel spacer tube 170a engages the ends of the outer races of bearings 168, 169 and the tube 170a fits inside the tubular portion 198, but is cut away to clear the driving gear 163. Bearings 168 and 169 are constructed as shown in FIG. 3.

Figure 8:
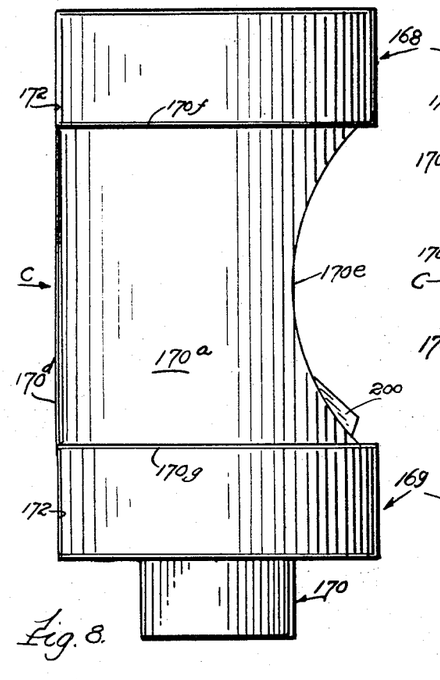
FIG. 8 is an enlarged side elevational view of the cartridge unit which is employed in all of the contra angle heads of FIGS. 1–7.
Figure 9:
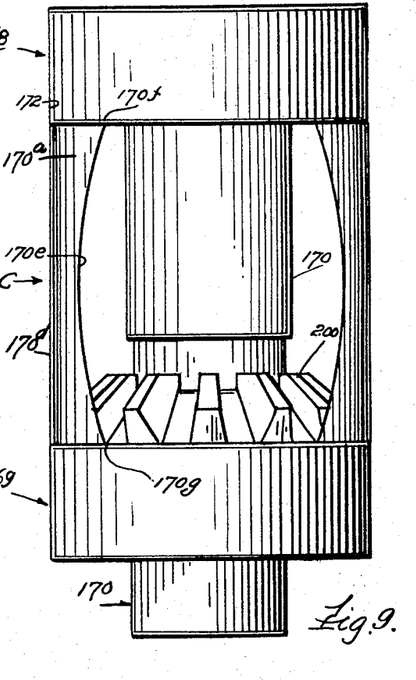
FIG. 9 is a second elevational view, taken from the right side of FIG. 8.

The stainless steel spacer tube 170a is shown in FIGS. 8 and 9, enlarged views of the ball bearing and shaft assembly which forms a cartridge unit that is removably secured in the cylindrical bore 198a.

The cartridge unit shown in FIGS. 8–11 is indicated in its entirety by the letter C and it includes the upper ball bearing assembly 168, the cylindrical sleeve 170a, the lower ball bearing assembly 169, the shaft 170, and the bevel gear 200.

The outer races of the ball bearings 168 and 169 have their outer cylindrical surfaces 172 flush with the outer cylindrical surface 170d of the cylindrical casing 170a. The cylindrical casing 170a has an oval opening 170e at one side for exposing the shaft 170 and the driven means 200, which comprises a bevel gear.

The opening 170e permits the insertion of the driving gear 163 and permits the entrance of air under pressure carrying lubricant mist for lubricating the bearings.

The end surfaces 170f and 170g of the casing 170a are accurately at right angles to the axis of the shaft, which axis is indicated at D—D in FIG. 2; and as stated in the description, the tube 170a fits inside the tubular portion 198.

The stainless steel spacer tube 170a engages the ends of the outer races of bearings 168, 169 and tube 170a fits inside the tubular portion 198, but is cut away to clear the driving gear 163. Bearings 168, 169 are constructed as shown in FIG. 3. The spacer tube or casing 170a is of accurate length to space the outer races of the bearings 168, 169 so that the race grooves of the outer races are accurately aligned with the race grooves of the inner races, definitely assuring the free rolling action of the balls 174 in the rotation of the shaft.

The tool shaft 170 carries the bevel gear 200, which is engaged by the inner race of bearing 169 and the outer race of this bearing is secured by a threaded ferrule 206 threaded into the end of the housing 198. The tool shaft 170 has an axial bore 207 for receiving bur shanks and other tool shanks.

The cylindrical bore 198a is slightly enlarged at the threaded end portion 206a for receiving the threaded ferrule 206, which constitutes an end closure for the housing 161 and is provided with spanner wrench sockets 206b.

The threaded ferrule 206 has a central cylindrical bore 206c which provides a clearance around the reduced end 170d of shaft 207 and this clearance, indicated at 206d, permits the exit of air from the lower ball bearings, the air being directed toward the bur or cutting tool carried by the shaft 207.

The threaded ferrule 206 is provided on its upper side with an annular shoulder 206e engaging only the lower face of the outer race of bearing 169 and the threaded ferrule 206 has a clearance of 206f for exit of air and for clearing the inner race.

Thus the lower inner race rotates free of the housing with the shaft, all of which clears the outer housing. At the upper end the annular shoulder 198b in the housing 198 engages only the upper face of the outer race, leaving a clearance at 205a for passage of air, which may exit through the slot 202.

Thus the air coming in at the opening 170e in the cartridge C may pass upward and downward through both ball bearings and out of the housing 161, providing continuous lubrication by means of the lubricant mist carried by the air.

Figure 10:
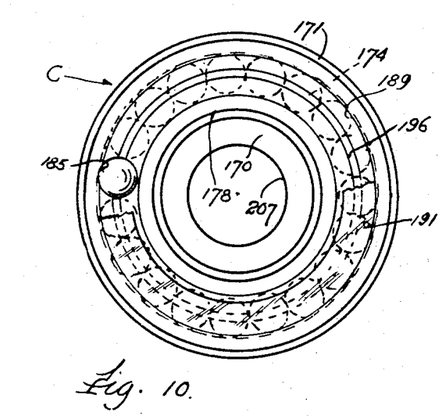
FIG. 10 is a bottom plan view of the cartridge unit of FIG. 8 and FIGS. 1–7.
Figure 11:
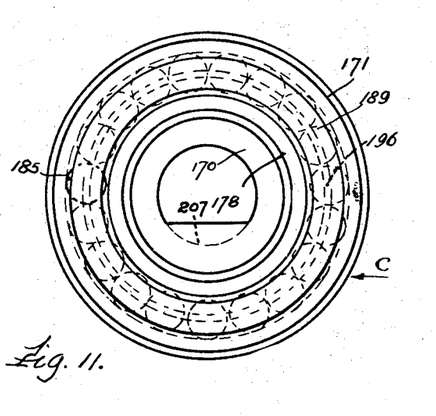
FIG. 11 is a top plan view of the same cartridge unit.

Referring to FIGS. 10 and 11, the cylindrical shaft bore is shown at 207, the shaft at 170, the inner race at 178, and the outer race at 171. The balls 174 are dotted in behind the plastic ring 189 and the clearance between the plastic ring and the inner race is indicated at 196.

Referring to FIG. 11, the upper end of the shaft is indicated at 170 and the inner race at 178, while the outer race is shown at 171. The clearance between the plastic ring 189 and the inner race is indicated again at 196.

The reduced portion 160 of tubular housing 157 also carries a metal plate 208 like the plate 159, having an aperture, and plate 208 is clamped between tubular portion 197 and housing 157. These plates 159 and 208 are used to support air and water nozzles.

The angular housing 151 of the contra angle is preferably formed with an aperture at 223 leading to its interior bore 224 (FIG. 2) and having a metal tube 225 mounted therein in either FIG. 1 or FIG. 2. This tube 225 has an externally ribbed end portion 226 for receiving a flexible, resilient plastic tube 227 in each case for supplying air and oil under pressure to the interior of the contra angle housing.

The air and oil escapes from the working end of the contra angle housing 198 through the ball bearings and inside the threaded ring 206, and provides a constant supply of air and oil escaping from those portions of the contra angle which would otherwise tend to receive foreign matter, such as saliva, grindings, water or the like. Since there is air and oil under pressure inside the contra angle housing, all foreign matter will be driven out and the tendency will be to keep the contra angle bearings clean, lubricated, and free of saliva and water and foreign matter.

It will thus be observed that the cylindrical bore 198a in the angle housing 198 provides cylindrical seats at its end portions for engaging the outside of the outer races at the cylindrical surfaces 172 for maintaining these outer races accurately concentric with the inner races, shaft, and axis D of the shaft.

Also, the annular shoulder 198b at the top of the housing 198 acts as a seat, engaging the end 181a of the upper outer race, while the annular surface 206e engages the lower end of the lower outer races and the threaded member 206 secures the outer races against the ends of the casing or sleeve 170a, clamping the outer races and casing in the housing.

This maintains the races spaced axially a predetermined precise distance which maintains the race grooves 177 and 183 radially opposite each other so that their axis A is constantly in alignment with the centers on which the race grooves are formed.

The inner races are concentrically received on the cylindrical portion 170b of the shaft 170 and the concentric portion 200b of the shaft and gear sleeve, and the axial location of the inner races on the shaft is maintained by the pressed fit of the inner races on the shaft and may be further assured by locating the inner races against the annular shoulder 170c and the lower side of the gear 200.

Figures 4, 5, 6:
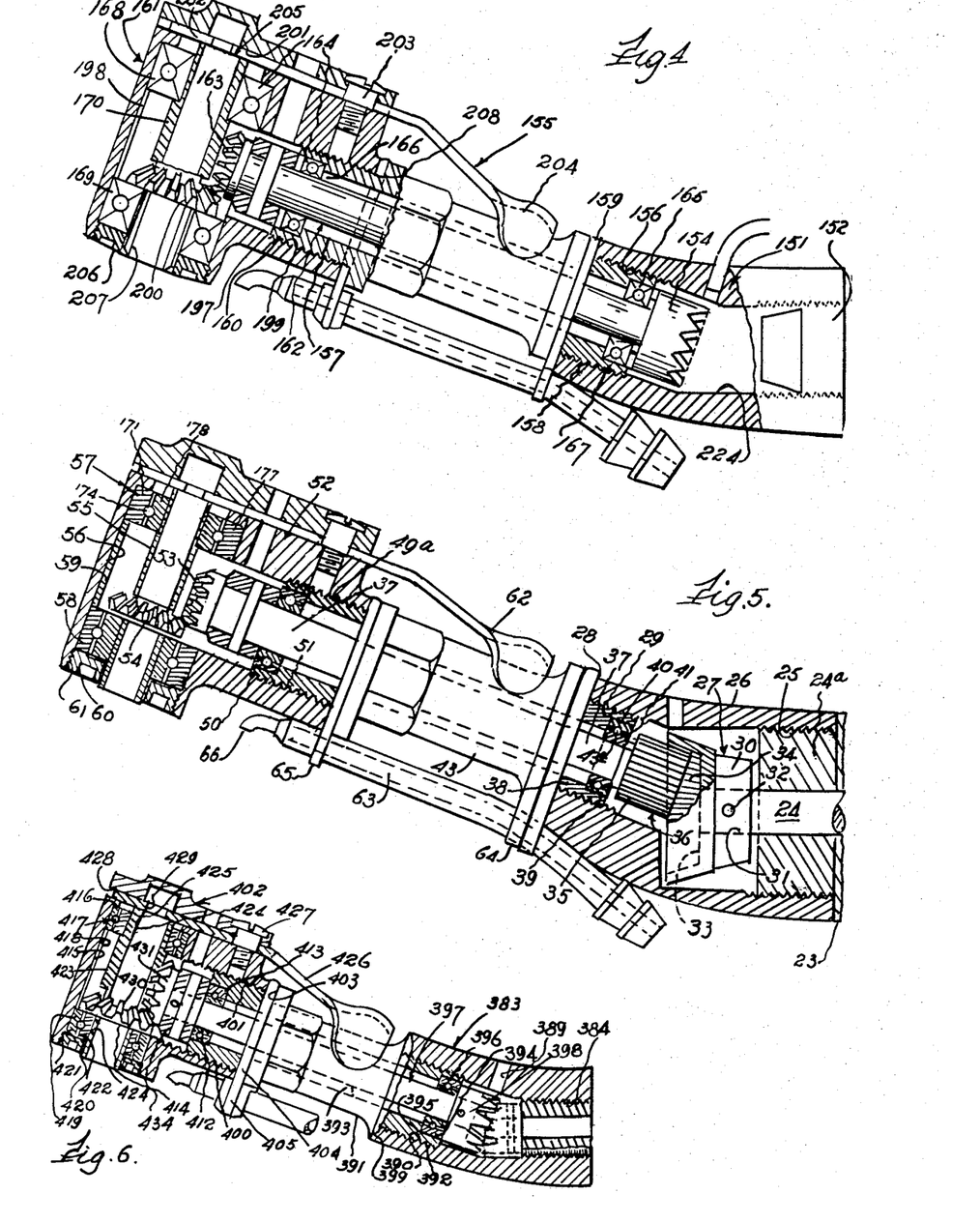
FIG. 4 is a view similar to FIG. 2 on a smaller scale, showing the ball bearing units diagrammatically.
FIG. 5 is a similar view of a modification showing a gear driven handpiece driven by a cup gear.
FIG. 6 is a view similar to FIG. 4 on a larger scale, showing a slightly different form of ball bearing.

Referring to FIG. 4, this is a view similar to FIG. 2 on a smaller scale, which is a reproduction of FIG. 7 of my prior application, Ser. 620,434, bearing the same numerals.

Referring to FIG. 5, this is a reproduction of the contra angle head of my prior application, Ser. No. 633,068, filed Jan. 8, 1957, showing a different form of contra angle embodying the same invention with the threaded closure on the lower end of the housing.

In this embodiment of the invention the contra angle is again supported by an attachment sleeve comprising a bearing body 22 for a shaft 24 carrying a cup gear 27. The body 22 has a reduced threaded end 24a for reception in a threaded bore 25 in the contra angle knee 26.

In order to provide for the internal gear the knee 26 is made larger than usual at its right end, tapered down to the smaller end 28, which has a smaller internally threaded bore 29.

The internal gear 27 has a hub 30 with a bore 31 for receiving shaft 24. Internal gear 27 is secured to the shaft by a through pin 32 and its left end is of cup shape, having a tapered cavity 33, provided with internal teeth and tooth spaces 34.

The taper of the cup 33 of the internal gear 27 is such that its teeth 34 extend parallel to the teeth 35 on a pinion 36, which may form an integral part of a contra angle shaft 37.

By means of the cup bear 27, which is preferably made of nylon, the stainless steel shaft 37 and its pinion 36 may be driven at about 125,000 r.p.m. when the handpiece shaft is driven at 50,000 r.p.m.

For example, the pinion may have eight teeth, while the cup gear has twenty teeth and by using a nylon cup gear driving a stainless steel shaft and pinion, wear is greatly reduced.

In addition to the reduction of wear by using these particular parts, the knee joint 26 is provided with an opening 37a, whereby the combined air and oil in the form of a mist may be applied under pressure to the inside of the knee joint 26.

This air and oil finds its way along the shaft 37 into the contra angle head, the parts of which are also constantly lubricated with the lubricant provided, which is of a non-toxic nature.

Various types of contra angles may be applied to this extension sleeve 22, one of which is shown in FIG. 1. The contra angle has a reduced threaded portion 38, which is threaded into the threaded bore 29 of the knee joint 26.

Reduced extension 38 has a counterbore 39 for receiving a ball bearing assembly 40, comprising inner and outer races 41, 42, and balls 43a for rotatably supporting shaft 37.

The contra angle includes a tubular member 43 having an externally threaded end portion 49a, and having another counterbore at its left end for receiving a similar ball bearing assembly 50, rotatably supporting the other end of shaft 37.

Reduced threaded portion 49a is threaded into a threaded bore 51 in the contra angle head 52 and shaft 37 supports a bevel gear 53, the teeth of which engage a bevel gear 54 on the bur tube or rotatable member 55.

The contra angle head 52 has a transverse bore 56 within which are arranged ball bearing assemblies 57 and 58, for rotatably supporting the bur tube 55, within which the tool shank is inserted.

A tubular spacer 59 separates the external races, but is cut away for the gear 53 and a threaded nut 60 surrounds the bur tube 55 and is threaded into the tool end 61 of the contra angle head to hold the outer races.

The inner races are mounted on the bur tube 55 and the head 52 may be provided with the pivoted lever 62 for engaging the tool shank and holding it in the bur tube 55.

Water and air tubes 63 are carried by rings 64 and 65, clamped between the ends of the tube 43 and the adjacent parts and the tubes have angularly directed nozzles 66, directing air and water toward the bur end of the tool. The ball bearings used at 57 and 58 and the contra angle head 52 are preferably of the type shhown in FIG. 3.

These ball bearings have outer races 171 and inner races 178 provided with balls 174. The races have grooves 177 in the outer race and 178 in the inner race and these grooves are preferably on a radius which is slightly larger than the balls 174, so that there will be line contact between the ball and its groove at its base.

The races preferably have a minimum clearance between them at 173 and each race has its groove communicating at one side with a slot 185 and 186 to provide a ball filling opening. This ball filling opening is used for the insertion of the balls into the ball bearing assembly and the balls are then prevented from jumping out into this filing opening by a nylon ring 189, which is pressed into a counterbore 187 in the outer race, and which has a minimum clearance between its inner edge 193 and the adjacent edge 194 of the inner race 178.

The nylon ring 189 in the ball bearings reduces to a minimum the leakage of air and lubricant mist from the contra angle, within which there is always a predetermined pressure, tending to drive any saliva or grindings out of the contra angle, which is also constantly lubricated.

Here again the contra angle head 52 has a cylindrical bore for slidably receiving the outer races of the ball bearing assemblies 57 and 58 and the outer races are spaced by the tubular spacer 59 and the unit comprising the shaft, gear and two ball bearing assemblies, spaced by sleeve 56, are secured in the head by the threaded nut 60 surrounding the bur tube 55 and threaded in the tool end 61 of the contra angle to hold the outer races against the sleeve 56, forming a removable cartridge unit.

It is, of course, necessary to remove the shaft 37 with its bevel gear 53 by screwing the body 43 out of the threaded bore 51 in the contra angle head before the cartridge unit can be taken out of the head.

Referring to FIG. 6, this is a reproduction of FIG. 27 of my prior application, Ser. No. 883,412, filed Aug. 13, 1959, showing another modification of a gear driven contra angle head in which the shaft or rotatable member bevel gear, two ball bearing assemblies and sleeve spacing the outer races form a cartridge unit fitting in a cylindrical bore 418 and secured therein by a threaded end closure 420 and described in said application as follows:

This contra angle attachment includes an elbow 383 ing a threaded bore 384 adapted to receive the threaded end 385 of the short attachment sleeve.

The elbow 383 has a bore 387 at an obtuse angle large enough to receive the toothed gear 388 and provided with an aperture 389 to which a plastic hose may be attached to supply the contra angle with lubricant in the form of a mist carried by air. The elbow has a threaded bore 390 for attachment to the contra angle sleeve 391, which has a threaded end 392.

The contra angle sleeve 391 has a through bore 393 communicating with a counterbore 394, which provides an annular shoulder 395 for engaging the outer race of the ball bearing assembly 396.

All the ball bearings employed in the handpiece and attachments and contra angle are preferably of the type shown in FIGS. 18–21, with spaced balls and a ball retainer holding the balls in a continuous groove without filling slots.

The outer race of the ball bearing assembly 396 is seated against the shoulder 395 in the counterbore 394 and may be frictionally held therein, while the inner race may be frictionally mounted on the shaft 397 and confined against removal by the gear 398, which is pinned to the shaft and adapted to engage gear 388.

The sleeve 391 has an annular shoulder 399 engaging the end of elbow 383 and is provided at its other end with a similar threaded portion 400 adapted to be received in the threaded bore 401 in the contra angle head 402.

In this case the sleeve 391 has an annular shoulder at 403 clamping a plate 404 against the annular shoulder 405 on the head, the plate having an aperture to receive the threaded end 400. The plate 404 has a lateral extension 405 having a bore for receiving the twin air and water pipes 406, 407, which are brazed in the extension 405 and held thereby, with nozzle ends 408 and 409 directed toward a tool carried by the contra angle.

The diverging ends 410, 411 of the tubes are provided with the flexible plastic air and water hoses (not shown).

The threaded plug 400 has a counterbore 412 for frictionally receiving the outer race of the ball bearing assembly 413 and the inner race is again mounted on the end of shaft 397, where it is held by the balls and retainer and by the gear 414 that is pinned to the shaft.

The contra angle head 402 has a bore 415 extending at right angles to the bore 400 and provided with an annular shoulder 416 at its upper end for engaging the outer race of ball bearing assembly 417.

A sleeve 418 acts as a spacer at the outer races of ball bearing assemblies 417 and 419 and the race 419 is engaged by a threaded plug 420 in a threaded bore 421 but there is a clearance at 422 between plug 420 and the inner race.

The shaft or rotatable member 423 comprises a hollow tube having an internal bore 424 with an inwardly extending lug 425 for engaging a flattened portion on a tool shank. A pivoted level 426 is pivoted on screw 417 and swings in a slot 428 to bring a laterally open slot 429 into a groove in the tool shank to retain the tool shank in the shaft bore 424. The shaft 423 has a reduced portion receiving at each end the inner races against annular shoulders and the races may be fixedly secured on the shaft, which has a bevel gear 430 engaging bevel gear 431 on shaft 397.

The inner races of ball bearing assemblies 417 and 419 have a tight frictional fit on the tubular shaft 423 and the sleeve 418 is cut away at one side toward the right in FIG. 6 to clear the bevel gear 434. The threaded plug 420 has a clearance about the shaft 423 so that the shaft may rotate freely with the inner races.

Thus FIG. 6 shows another modification in which the construction of the ball bearings and their installation in the contra angle head is in the form of a removable cartridge unit slidably mounted in a cylindrical bore 418 with the outer races spaced by a metal sleeve 415 and secured against an annular shoulder 416 at one end by a threaded closure 420 in the other end of the cylindrical bore.

Referring to FIG. 7, this is a reproduction of FIG. 2 of my prior application, Ser. No. 633,068, showing another modification of a contra angle of the ball bearing type in which the shaft, bevel gear, and two ball bearing assemblies have their outer races spaced by a metal sleeve and secured against an annular shoulder in the housing by means of an upper threaded member engaging the upper outer race, specifically described as follows:

The contra angle housing 247 has a threaded bore 249 for receiving the threaded end 250 of the tubular member 234 and it has a transverse housing portion 251 for rotatably supporting the bur tube or rotatable member 252.

The tubular member 234 has a through bore 253 for passing the shaft 243 and has a counterbore 254 for receiving the ball bearing assembly 255.

Ball bearing assembly 255 has an inner race 256 mounted on shaft 243, and separated by balls 257 from the outer race 258, which is mounted in counterbore 254 against an annular shoulder 259.

Shaft 243 carries a bevel gear 260, secured to the shaft by a transverse pin 261, passing through both the gear hub and shaft. Bevel gear 260 has beveled teeth 262 for engaging the beveled teeth 263 on a bevel gear 264, carried by the bur tube 252.

The transverse part 251 of the contra angle housing has an internal bore 265 which terminates at an annular shoulder 266 toward the tool end of the housing portion 251.

A ball bearing of the type shown in FIG. 3 is indicated at 267, and has its outer race 268 in the bore 265 engaging annular shoulder 266.

The housing portion 251 has a smaller counterbore 269 at the top, forming an annular shoulder 270 for engaging the outer race 271 of another ball bearing assembly 272. Outer races 271 and 268 are secured and spaced from each other by a spacer tube 273, which fits in the bore 265, but is cut away on the side toward the bevel gear 260 so that it will not interfere with this bevel gear.

The housing portion 251 has a threaded counterbore 274 for receiving the threaded portion 275 of a threaded plug 276, which contains the counterbore 269, and also has a smaller bore 277. Threaded plug 276 is adapted to secure the outer races and the spacer tube 272 in the housing, but has an outer cylindrical surface 278.

The bur tube 252 comprises a metal tube having an internal bore 279 adapted to receive a bur shank 280, which projects from the lower end and carries a bur or other tool.

The bur tube has a thicker portion at 281, forming an annular shoulder at 282 for engaging below the inner race 283 of the upper ball bearing assembly 272. The bur tube has the reduced cylindrical portion 284, which supports the bevel gear 264 and the bevel gear 264 has a tubular portion 285 extending to the end 286 of the contra angle housing portion 251.

The inner race 287 of the lower bearing is mounted on the tubular portion 285 of the bevel gear 264 and the usual balls 288, 289 are mounted in the grooves of the races. The bur shank 280 is provided with a flattened end portion 290, for engaging a complementary mating flattened portion inside the bore 279 of bur tube 252.

This forms a positive drive between the bur tube and the bur shank. At its upper end the bur shank 280 is provided with an annular groove 291, which may be rectangular in cross section and which leaves an annular head 292 on the end of the bur shank.

Groove 291 is adapted to receive an inwardly projecting pin or prong 293 carried by a rotating burlock 294. Burlock 294 comprises a tubular member adapted to rotate on the upper end of bur tube 252, and provided with shallow V shaped teeth 295 on its upper end.

At the lower end of the bur tube 252 in the tubular extension 285 of the bevel gear 264 there is a nylon sleeve or sealing ring 305. This has a tight frictional fit in the tubular extension 285 and has a bore which is a continuation of bur tube bore 279 and which grips the tool shank 280 and seals it against entry of grit or grindings and also against the exit of air and lubricating mist.

The air and lubricating mist, however, may escape through the ball bearing assembly 267 at the clearance 207, around the tubular extension 285.

The contra angle is preferably provided with ball bearing assemblies 267 and 272 of the type shown in FIG. 3.

These ball bearings have the same concentric inner cylindrical bore in the inner race and the same concentric outer cylindrical surface on the outer race. The end surfaces of the race are at right angles to the axis of the races and the inner races are a pressed frictional concentric fit on the cylindrical surfaces of the bur tube or shaft 252.

The inner races are definitely located against annular shoulders 282, 285 on the shaft and the races have the same inner and outer concentric race grooves formed on a radius larger than the balls and the races have their grooves aligned axially.

The outer races are concentrically located in the cylindrical bores of the housing and threaded plug and the casing 273 has plane ends at right angles to the axis of the shaft and these ends engage the outer races, precisely spacing the outer races so they are maintained in axial alignment with the inner races. The casing 273 fits in the cylindrical bore and the shaft, gear, ball bearing units and casing form a removable cartridge unit, secured in the housing by threaded plug 276.

Air under pressure carrying lubricant mist is introduced at aperture 208 and passes through ball bearings of extension 234 and ball bearings 267 and 272 and out of top and bottom of housing 251, effecting continuous lubrication.

Referring to FIGS. 12-24, these drawings are reproduced from the principal figures shown in my prior application, Ser. No. 789,751, filed January 28, 1959, on Air Driven Dental Handpieces and the drawings and numerals are the same that the part numerals have been increased by adding the digit 5 in front of every part owner and except for a change in the shape of the upper end of the stator 577, as described herein.

Figures 12, 13, 14, 15, 16:
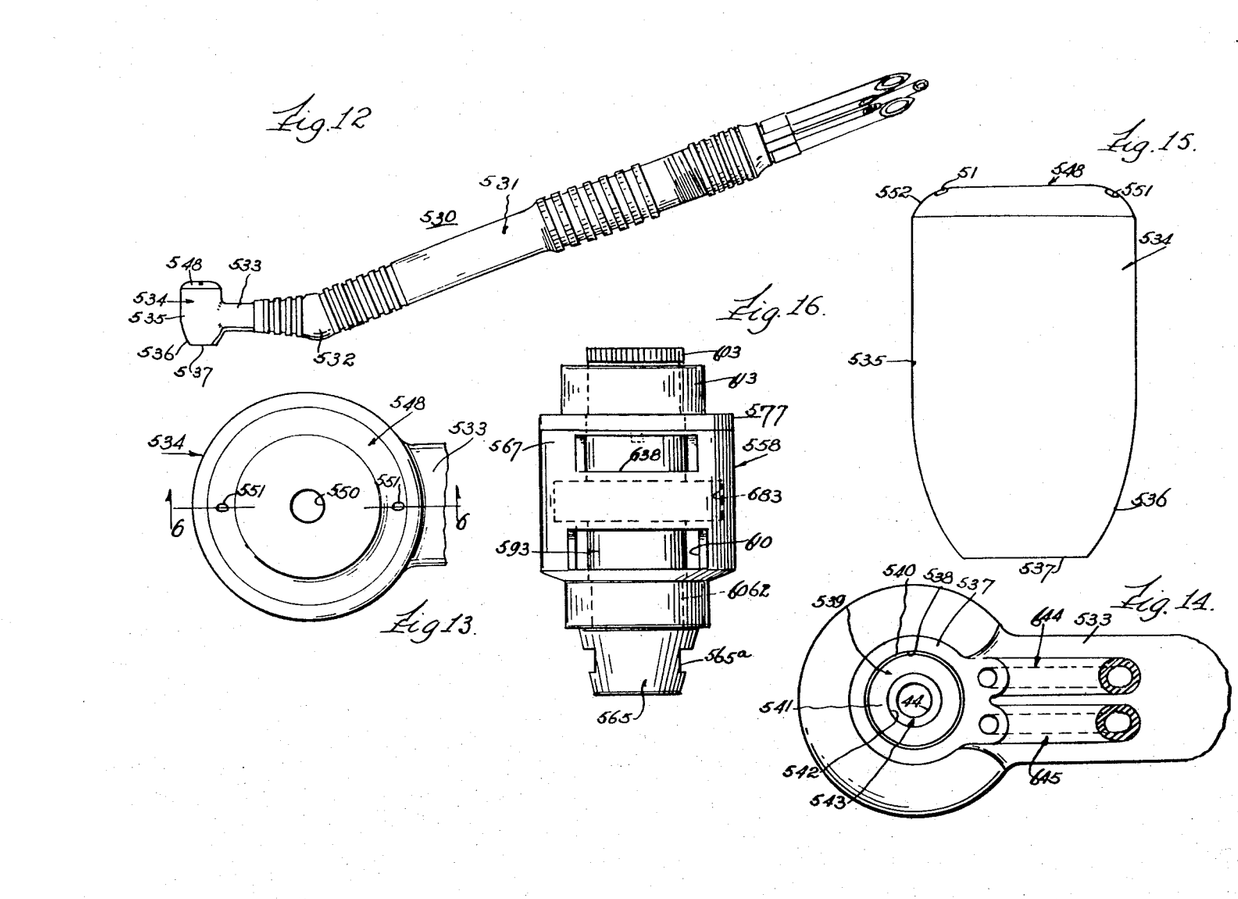
FIG. 12 is a full size side elevational view of an air driven dental handpiece embodying the invention.
FIG. 13 is a fragmentary top plan view.
FIG. 14 is a fragmentary bottom plan view of the head of FIG. 12.
FIG. 15 is an end elevational view of the head of FIG. 12, taken from the left of FIG. 12.
FIG. 16 is a side elevational view of the cartridge unit of the air driven handpiece of FIG. 12.

Referring to FIGS. 12-16, the air driven handpiece 530 embodying the invention is shown full size in FIG. 12.

It preferably comprises a handle tube 531 carrying an elbow fitting 532 at its lower end, which supports the neck tube 533 at an obtuse angle to the handle 531 and the neck tube 533 carries a handpiece head 534, comprising a housing member made of brass, nickel-chrome plated (FIG. 12) and the head 534 may be substantially cylindrically shaped, having a cylindrical wall 535, which is rounded and tapered at its lower portion 536 to remove as much as possible of that portion of the housing which might obscure the view of the end of a dental bur mounted in the head 534.

The lower end of the head 534 has a generally plane surface 537, which is provided with a central circular aperture 538 that is slightly spaced from the circular 539 of a rotating bur shaft, leaving an annular clearance 540 serving as an annular air escape and air nozzle for air issuing from the housing of the handpiece.

It is this escaping air which is so restricted at the annular nozzle 540 that it maintains an air pressure inside the handpiece housing and excludes the ingress of dirt and grindings by the outward flow of air from the handpiece housing under operation.

The end of the bur shaft or spindle 539 is shown at 541 and the bur shaft has a cylindrical bore 542 which contains a plastic bur tube 543, having a cylindrical bore 544 for frictionally gripping the cylindrical portion of the shank of a bur or other tool to be driven by the handpiece. The cap 548 is preferably of stainless steel.

The head 534 is open at its upper end, being provided with a cylindrical bore 545 (FIG. 17) having an internally threaded counterbore 546 at its upper end for receiving the externally threaded portion 547 of a top cap 548, which closes the upper end 574 of the housing, except for the central aperture 550 in the cap that is used for inserting a tool employed in pushing out the shank of a dental bur when it is to be removed.

Figure 17:
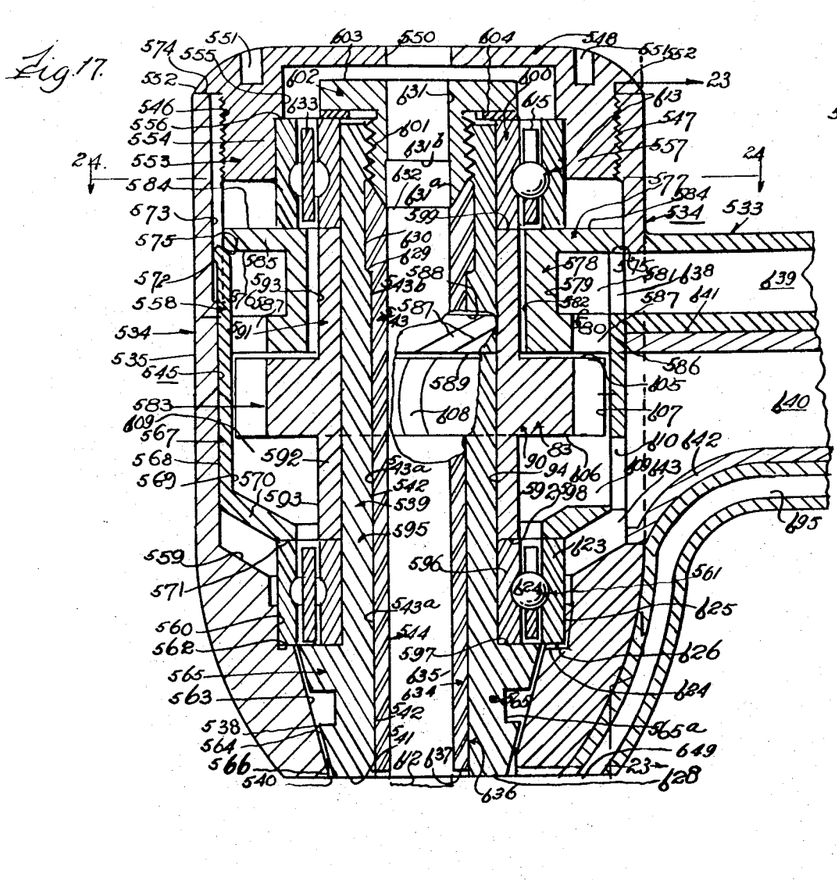
FIG. 17 is an axial sectional view on an enlarged scale taken through the head of the air driven handpiece on the plane of the line 6—6 of FIG. 13.

The cap 548 has a pair of diametrically opposite circular sockets 551 for receiving the lugs of a spanner wrench used in tightening the cap. The cap is rounded at its outer edge portion 552 and may be threaded so far into the head 534 that its edge merges with the top of the head, forming a smoothly rounded upper corner without projections that might injure the mouth.

At its lower side the cap 548 has the plug formation 553, which is provided with a bore 554, large enough to receive the upper outer race of the ball bearing assembly and the plug is formed with a smaller counterbore 555 for receiving the upper end of the spindle and its associated parts, with a clearance so that the spindle may rotate without contacting the cover.

The plug formation 553 has an annular shoulder 556 for engaging the outer race of the upper ball bearing assembly 557 to secure the removable turbine unit 558 in the head 534.

The head 534 has a frustoconical inner surface 559 toward its lower end and a reduced counterbore 560 for receiving the outer race of the lower ball bearing assembly 561 against an annular shoulder 562. From the annular shoulder 562 the interior of the head 534 has a frustoconical inner surface 563, providing a clearance with respect to an external frustoconical surface 564 on an enlargement 565 of the bur shaft 539, thereby forming the annular nozzle clearance 540, which is slightly enlarged at its lower end by forming a flaring crack 566 of annular shape.

This annular crack or nozzle permits air to escape from the interior of the head housing 534, but maintains sufficient resistance to its escape to provide a pressure inside the housing, to exclude dirt and grindings from the housing.

The air turbine constitutes a removable unit 558 because all of its parts are carried by a cylindrical stainless steel shell 567. This shell 567 has an outer cylindrical surface 568 and an inner cylindrical bore 569.

At its lower end it has an inwardly extending frustoconical flange 570, terminating in an annular end surface 571 so that engages the outer race of the lower ball bearing assembly 561 to secure it in the head 534.

The shell 567 fits in the bore 545 of the head 534 and is secured against rotation therein by an outwardly turned tab or lug 572 pressed out of its upper edge to extend into a rectangular groove 573, which extends upwardly across the threads 546, and is open at the top end 574 so that the turbine unit may be slid downward into the bore 545 when the lug 572 registers with the groove 573 but thereafter it cannot rotate.

The upper end of the shell 567 is indicated at 575, presenting an annular surface which engages the lower surface 576 of the upper enlargement 577 of the stator 578. The stator 578 comprises a cylindrical body or enlargement 577 integrally joined to a central tubular portion 579 and a lower cylindrical body 580, which forms a floor or lower wall of an annular rectangular groove 581 serving as a stator air manifold.

The tubular portion 579 of the stator 578 has a central through bore 582, clearing the parts of the rotor 583. The top 584 of the stator engages the lower edge of the outer race of the upper ball assembly 557, which is located in the counterbore 554 in the cap 553, concentrically supporting the upper outer race.

The stator enlargement 577 closes the upper end of the stator manifold 581 by engaging the shell 567 and the lower floor 580 of the stator engages in the shell bore 569 with its outer cylindrical surface 586 and closes the lower side of the air manifold 581, except that the floor 580 of the stator has a multiplicity of nozzle slots 587, which form nozzle apertures in combination with the inner surface 509 of the shell 567.

The slots 587 in the stator floor are at an acute angle to the upper and lower stator surfaces 588, 589 so that the air issuing from the surface 589 of the stator may have an axial component to move the air out of the stator and into the rotor but the major component is in a peripheral direction and in the direction of rotation of the rotor.

The angularity may vary and I have found that an angle of 60 degrees to the axis of the turbine produces a driving torque which is stronger than the devices of the prior art and that performance is improved at an angle of 65 degrees.

The slots 587 in the stator are made by means of a milling cutter and while a suitable torque has been produced by using slots fifteen thousandths of an inch in width, I prefer to employ slots ten thousandths of an inch in width, this being the width of the milling cutter, for the reason that this reduces air consumption and still provides excellent torque.

This results in slots which are parallel walled and substantially rectangular and complementary in shape to the cutter. A multiplicity of such slots is provided, such as eight slots in the stator of this size, with thirty-two slots in the rotor. This also reduces the possibility of the existence of a dead center, as each air nozzle is directed toward four slots in the rotor.

The rotor 583 comprises a substantially cylindrical metal body preferably made of brass, like the stator and shell and the body 590 is integrally joined to a pair of tubular extensions 591, 592 having cylindrical outer surfaces 593 and a cylindrical bore 594.

The cylindrical bore 594 is adapted to receive the tubular body 595 of a bur shaft 539, preferably of stainless steel, which has the frustoconical enlargement 565 at its lower end. The cylindrical part 595 of the bur shaft may support the inner race 596 of the ball bearing assembly 561 against the annular shoulder 597 and this race is in turn engaged by the end surface 598 of the tube 592. The races and balls are preferably made of stainless steel.

The tube 592 and the rotor 583 and upper tube 591 are mounted on the bur tube and the upper end 599 of the rotor tube 599 engages the bottom of the upper ball bearing race 600. The bur tube 539 is provided at its upper end with inner threads 601 and with a screw plug 602 threaded into the threaded bore. The screw plug has a laterally extending or radial flange 603, the bottom of which may engage a metal washer 604, which engages the upper race 600. Thus the inner races and the rotor are secured on the bur shaft, on which they may also have a close fit. The threads on the screw plug 602 are left hand to prevent the plug from being loosened by right hand rotation of the bur shaft 539.

The cylindrical rotor body 590 has an upper plane surface 605 and a lower plane surface 606 which are spaced farther from each other than the thickness of the stator floor.

The rotor body 593 has a cylindrical outer surface 607, which has a close clearance with respect to the inner surface 569 of the shell, but permits the rotor to rotate freely without contact. The rotor is preferably provided wiht four times as many slots in its periphery as there are slots in the stator and the rotor slots are cut by means of a tubular milling cutter, which has a sufficient large diameter and is used on a rotor of smaller diameter so that one edge of the tubular cutter may cut a curved slot like that indicated at 608 in the rotor 583, there being 32 such slots, for example, in a rotor which produces a high torque.

The curvature of the slots 608 relative to the upper and lower surfaces of the rotor depends on the location of the tubular cutter, which in FIG. 17 had its axis located midway between the upper and lower surfaces of the rotor. This makes the curvature a circular arc symmetrically located across the rotor.

By employing stator jets only one-fourth in number to the number of the rotor slots a more smooth rotating torque is impressed on the rotor and by employing the specific construction shown, the air passing through the stator and rotor take the shortest possible path, with a minimum amount of turbulence and a maximum amount of torque.

The air is discharged into a lower expansion chamber 609, from which the air is exhausted out of the turbine at a lateral exhaust port 610. The air is also used to pass through the lower ball bearing assembly 561 at the spaces between the balls and the air issues through the conical slot 566 and is discharged in a conical spray toward the cutting end 611 of the bur 612 due to the flare 566, which exists at the lower end of the slot 540.

The clearance between the upper surface 605 on the rotor and the lower surface of the stator floor is quite close, in the nature of seven thousandths of an inch, but the rotor and its bearing parts have a limited axial freedom due to a certain looseness of the balls in the ball bearing races.

The structure of the ball bearings employed in the turbine is of the utmost importance and they are preferably constructed substantially as shown in my prior application, Case 28, Ser. No. 752,447, on Ball Bearing Assemblies and Methods of Making Them, filed August 1, 1958 and the disclosure of that application is hereby incorporated herein by reference thereto.

Each of the ball bearing assemblies 557 and 561 includes the following parts. The bearing assembly 557 includes the inner race 600, outer race 613, balls 614, and ball retainer 615. The races and balls are preferably made of hardened stainless steel, but carbon steel balls may also be used.

The structure of the ball bearings is shown in FIGS. 18–22, which are reproductions of the views on these ball bearings shown in my application Ser. No. 833,412, filed Aug. 13, 1959, FIGS. 34–38 therein.

Figure 18:
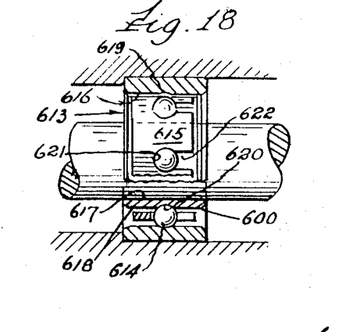
FIG. 18 is a side elevational view in partial section of one of the ball bearing units employed in FIG. 17.

The outer race 613 has cylindrical outer surfaces 615 and inner cylindrical surface 616. The inner race 600 has the inner cylindrical surface 617 and the outer cylindrical surface 618. The ends or edges of both races are plane but the corners are preferably chamfered.

The outer race 613 has a ball groove 619 of partially circular cross section on its inside formed on a radius larger than the radius of the ball 614 and the inner race 600 has an outer groove 620 registering with the groove 619 and formed on a radius which is larger than the radius of the balls 614.

The ball grooves 619 and 620 are uniform in cross section and extend all the way around the inside and outside, respectively, of the outer and inner races and there are no filling grooves.

The grooves are not filled with a full complement of balls 614, but only include a lesser number, so few that when all the balls are arranged on one side, there is a sufficient crack between the inner race and the outer race to insert or remove balls edgewise into or out of the crack until they reach the groove.

Figure 19:
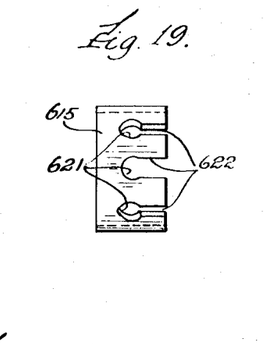
FIG. 19 is a side elevational view of one of the ball retainers.
Figure 20:
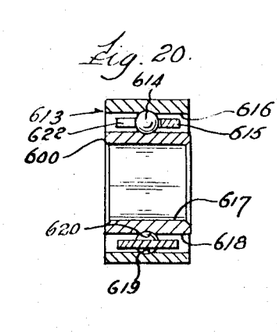
FIG. 20 is an axial sectional view taken on the plane of the line 38—38 of FIG. 21.
Figure 21:
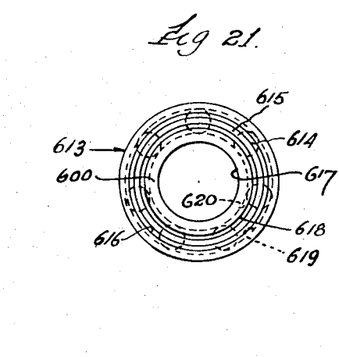
FIG. 21 is an elevational view of one end of the ball bearing units, being the left end of FIG. 18.
Figure 22:
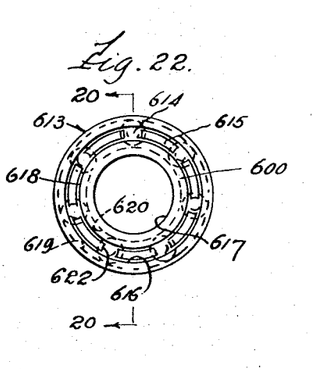
FIG. 22 is an elevational view of the other end of the ball bearing unit of FIG. 21.

For example, the present bearings include seven balls, which are equally spaced in the grooves by the ball retainer 615. The ball retainer comprises a plastic member of lubricating characteristics, such as nylon or some polyethylene compound and the ball retainer is made out of a short length of nylon tubing which forms a closed annulus of such size that it may be received between the inner race and the outer race with a clearance with respect to both of them.

The retainer 615 has seven ball sockets 621, comprising circular bores, the diameter of which may be 0.043 when balls are employed having a diameter of 0.0394". The inner diameter of the inner race 600 may be 0.125" or 0.135", depending on the shaft diameter.

The outer diameter of the outer race may be ¼". The length of the races may be 3/32" and the ball retainer may be 0.081 in axial length.

The ball retainer 615 is provided for each ball bore 621 with a longitudinally extending slot 622 and this slot is of smaller size than the diameter of the balls. For balls having a diameter of 0.0394" the slots may be 0.035" or 4/1000 narrower than the balls.

This permits the balls to be pressed into the slots or the slots to be pressed over the balls by exerting a predetermined force. The balls snap into the bores 621, where they are retained by the restricted slots.

The dimensions given in this specification are merely by way of example, and may be varied in devices of different sizes.

The balls being held in the assembly by engagement with the grooves and the balls being spaced by the retainer, the balls hold the retainer in the position of FIG. 17, where it floats.

The clearance between the outside of the retainer and the outer race is less than the clearance between the inside of the retainer and the inner race for the purpose of making sure that there is no drag between the retainer and the inner race which rotates rapidly.

For example, the clearance between the inner race, and the inside of the ball retainer may be 0.006" and the clearance on the outside of the ball retainer with respect to the outer race may be 0.0035".

When the rotor rotates, the inner race 600 necessarily rotates with it and the balls roll in the groove 620 but they rotate in the opposite rotative direction. It is believed that the balls are thrown out by centrifugal force, engaging in the groove 619 of the outer race, where they may have less slippage than they have with respect to the inner race.

The nylon retainer floats between the races, engaging neither of them, but it rotates and moves with the balls.

It is believed that the air, entraining a mist of lubricant, which is forced through the bearings, serves to keep the ball retainers concentrically located and lubricant is deposited on the retainer and races and the balls, which are constantly lubricated thereby.

The structure of the lower bearing assembly 561 is the same and the inner race is indicated at 596, the outer race 623 and the balls 624.

The air driving the turbine, containing lubricant mist, leaks along the clearances between the rotor 583 and the stator 578 to the upper bearing assembly 557 and may escape through the hole 550. When the air reaches the aperture 550, the amount of lubricant passing has already been reduced to a minimum, being deposited as drops in the bearings.

The lower bearing assembly 561 is exposed to air from the expansion space 609, carrying lubricant mist and this air is passed through the bearings to the annular slot between the outer frustoconical surface 564 and the inner frustoconical surface 563, lubricating the bearing 561 during its passage.

Figure 23:
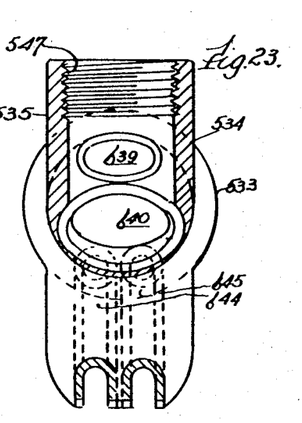
FIG. 23 is a fragmentary sectional view taken on the plane if the line 23—23 of FIG. 17, looking in the direction of the arrows.
Figure 24:
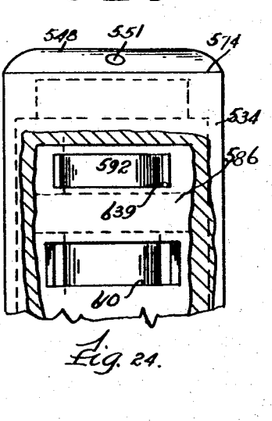
FIG. 24 is a fragmentary sectional view taken on the plane of the line 24—24 of FIG. 17, looking in the direction of the arrows.

I have found that it is desirable to increase the amount of air escaping from the annular clearance 540 about the bur shaft head 565 as follows. The bore 560, forming a socket for the outer race 623, has its wall provided with a channel, which may be 1/32" wide, extending down the cylindrical inner wall 560 at 625. This channel communicates with groove 626 located in the base of bore 560 in the annular shoulder 562 and provides additional leakage of drive air past the ball bearing 561 to the conical nozzle 540.

This increases the air issuing from the nozzle clearance 540 in a conical air stream about the bur shaft 612 and converging on the bur 611 to increase the cooling effect.

The bur shaft 539 comprises a stainless steel tube having a cylindrical bore 627 and a plane end 628 and terminating in the threaded counterbore 601 at the top.

The bur shaft has an annular shoulder at 629 and a slightly larger counterbore 630 extending upward from said shoulder where the bore is enlarged by several thousandths to form the annular shoulder 629.

The bur shaft has a pair of parallel flats 565a on its enlarged head for grip by a wrench.

The hollow threaded plug 602 of stainless steel has a through aperture 631, which terminates in a sharp edge 632 and a beveled end surface 633 engaging the end of the plastic tube 634 which is preferably made of Teflon. The plastic tube 634 has an inner cylindrical bore 635 and an outer cylindrical surface 636, the outer diameter of which is initially uniform throughout its length, except that a short portion at the lower end is a few thousandths greater outer diameter.

The purpose of making the lower end slightly larger is to compress the plastic sleeve into the bur tube 539 at its lower end, while a mandrel is inserted in the bore 635 so that the Teflon is under greater compression at that point, where there is a maximum lateral pressure exerted on the bur shank.

At its upper end the plastic tube 634 is also initially of the same uniform outer diameter throughout but as the plastic tube 634 is forced into the bore 627 with a mandrel having an annular shoulder engaging the end 637, the upper end engages the beveled end 631a of the plug 602 and the Teflon is forced outward and expanded into the counter 630 anchored against the annular shoulder 629 for retaining the plastic tube in the bur shaft.

The plastic tube is adapted to grip the cylindrical portions of shanks of burs and other tools, even though they have flats or slots or other formations beneath their cylindrical surfaces for locking the shank in, in other types of handpieces.

The inlet port for the air turbine unit comprises a rectangular aperture 638 in the curved cylindrical wall of the shell 567 and the outlet port for the turbine is indicated at 610 in shell 567.

It will thus be observed that the present ball bearing construction for dental handpieces may be embodied in a gear driven or air driven form. In each case the shaft comprises a tubular member having a bore concentric with the axis of the handpiece head and having a plastic tube concentrically mounted therein and gripped frictionally and provided with a concentric bore for frictionally gripping the concentric cylindrical shaft of a dental bur.

The tubular shaft is rotatably supported by a pair of concentric ball bearing assemblies, each of which has its inner race provided with a concentric bore which is press fitted on the exterior concentric surface of the tubular shaft.

The races in each case have concentric grooves of partially circular cross section located equal distances from the ends of each race and the races have plane end surfaces located in the same plane on the shaft so that the race grooves are in alignment. While the inner races may be held by being a press fit on the tubular shaft, they are preferably seated against an annular shoulder at each end of the tubular shaft and in the air driven type the inner races are seated against an intermediate spacing sleeve on each end of the rotor and the inner races are clamped in position against the annular shoulder 597 by the annular flange 603 on the screw plug 602.

Thus the air driven embodiment of FIG. 17 represents a further improvement over the gear driven type in that the inner races are positively secured against axial movement. The inner races cannot be displaced axially by a blow on the handpiece head, as might be the case where they merely have a pressed fit.

The housing in both the air driven and the gear driven type has upper and lower cylindrical surfaces holding the outer races centrically with respect to the axis of the shaft and the outer races are accurately spaced in both the air driven and gear driven handpieces by a cylindrical casing 170a or 558 which reacts against the outer races and holds them in alignment with the inner races.

The screw cap in each case engages the outer faces of the outer races and clamps the outer races against the cylindrical casing, constituting a removable cartridge fitting in the cylindrical housing in a cylindrical bore and removable by removing the screw cap 206 or 548.

In each case air comes in at the handle, going into the head housing 161 or 534 and the air carries lubricant mist some of which passes through the ball bearings, lubricating them continuously and passing out of the top and bottom of the head housing.

In each case, in the gear driven or the air driven, there is an opening around the shaft, discharging air along the bur shaft for cooling the bur or the work being ground.

While I have illustrated a preferred embodiment of my invention, many modifications may be made without departing from the spirit of the invention and I do not wish to be limited to the precise details of construction set forth, but desire to avail myself of all changes within the scope of the appended claims.

Having thus described my invention, what I claim as new and desired to secure by Letters Patent of the United States, is:

1. A dental handpiece comprising in combination, a handle having a housing on one end thereof connected thereto and provided with an opening therein; a cartridge assembly comprising an elongated rotatable member having drive means intermediately of the ends thereof, anti-friction bearing units having inner and outer races, the inner races thereof respectively receiving concentrically the opposite ends of said rotatable member, a casing surrounding the drive means of said rotatable member, the opposite end portions of said housing having seats respectively receiving the outer races of said bearings to maintain the same coaxial with said casing and maintain said races spaced axially a predetermined precise distance, said cartridge assembly being removably mounted operatively within said housing and positionable therein as a unit by insertion thereof through said opening; and means engaging said housing and assembly and operable to secure said cartridge assembly in operative position within said housing.

2. The dental handpiece set forth in claim 1 further characterized by said casing and outer races of said bearing units having axially reacting portions to limit axial movement of said outer races toward each other when said rotatable member is in operative position.

3. The dental handpiece set forth in claim 1 further characterized by said housing of said handpiece having port means to conduct gaseous fluid to and from the interior of said housing, said casing of said cartridge assembly also being provided with port means registrable with said port means of said housing and interengaging means respectively on said housing and casing operable to prevent rotating therebetween about the axis of said rotatable member, thereby maintaining the port means of said housing and casing in registry with each other when assembled.

4. A dental handpiece comprising in combination, a handle having a housing on one end thereof connected thereto and provided with an opening therein; cartridge assembly comprising an elongated rotatable member having drive means intermediately of the ends thereof, anti-friction bearing units having inner and outer races, the inner races thereof respectively receiving concentrically the opposite ends of said rotatable member, a casing surrounding said rotatable member and the opposite end portions of said housing having annular seats respectively receiving the outer races of said bearings to maintain the same coaxial with said casing, said casing having faces extending transversely to the axis of said bearing units and reacting complementary faces respectively on the outer races of said bearing units to maintain the same spaced axially a predetermined precise distance, said cartridge assembly being removably mounted operatively within said housing and positionable therein as a unit by insertion thereof through said opening; and means operable to secure said cartridge assembly in operative position within said housing.

5. The dental handpiece set forth in claim 4 further characterized by said outer races of said bearing units extending axially outward from said casing whereby the projecting outer end of one of said races is positioned to be engaged by said securing means and said housing of said handpiece having a seat within which the projecting outer end of the other outer race is received when said cartridge assembly is positioned operatively with said housing.

6. The dental handpiece set forth in claim 5 further characterized by said securing means comprising a cap threadable relative to the end of said housing to connect said cap thereto and close the opening therein and said cap having a portion engaging the end of the outer race of the adjacent bearing unit to clamp the cartridge assembly within said housing.

7. A dental handpiece comprising in combination, a handle having a housing on one end thereof connected thereto and provided with an opening therein; a cartridge assembly comprising an elongated rotatable member having drive means intermediately of the ends thereof, anti-friction bearings having inner and outer races, the inner races thereof respectively receiving concentrically the opposite ends of said rotatable member, a casing surrounding said rotatable member, the opposite end portions of said casing respectively reacting against the outer races of said bearings in an axial direction to maintain the same spaced axially a predetermined precise distance, said cartridge assembly being removably mounted operatively within said housing and positionable therein as a unit by insertion thereof through said opening; and means operable to secure said cartridge assembly in operative position within said housing.

8. A dental handpiece comprising in combination, a handle having a housing on one end thereof connected thereto and provided with an opening therein; cartridge assembly comprising an elongated rotatable member having drive means intermediately of the ends thereof, anti-friction bearings having inner and outer races, the inner races thereof respectively receiving concentrically the opposite ends of said rotatable member, a casing surrounding the drive means of said rotatable member, the opposite end portions of said casing respectively reacting against the outer races of said bearings to maintain the same spaced axially a predetermined precise distance, said cartridge assembly being removably mounted operatively within said housing and positionable therein as a unit by insertion thereof through said opening; and means operable to secure said cartridge assembly in operative position within said housing.

9. A dental handpiece comprising in combination, a handle having a housing on one end thereof connected thereto and provided with an opening therein; a cartridge assembly comprising an elongated rotatable member having drive means intermediately of the ends thereof, anti-friction bearings having inner and outer races, the inner races thereof respectively receiving concentrically the opposite end of said rotatable member, a casing surrounding the drive means of said rotatable member, the opposite end portions of said casing respectively reacting against the outer races of said bearings to maintain the same spaced axially a predetermined precise distance, said cartridge assembly being removably mounted operatively within said housing and positionable therein as a unit by insertion thereof through said opening; and means operable to secure said cartridge assembly in operative position within said housing.

10. A dental handpiece comprising in combination, a handle having a housing on one end thereof connected thereto and provided with an opening therein; a cartridge assembly comprising an elongated rotatable member having drive means intermediately of the ends thereof, anti-friction bearing units having inner ad outer races, the inner races thereof respectively receiving concentrically the opposite ends of said rotatable member, a cylindrical casing surrounding the said rotatable member and the opposite end portions of said housing comprising annular seats respectively coaxially receiving the outer races of said bearings, the under faces of said outer races abutting respectively the opposite ends of said casing to maintain said outer races spaced axially a predetermined precise distance, said cartridge assembly being removably mounted operatively within said housing and positionable therein as a unit by insertion thereof through said opening; and means operable to secure said cartridge assembly in operative position within said housing.

11. The dental handpiece set forth in claim 10 further characterized by said casing comprising a unitary tube having port means in the wall thereof for the passage of gaseous fluid therethrough.

12. A dental handpiece comprising in combination, a handle having a housing on one end thereof connected thereto and provided with an opening therein; a cartridge assembly comprising an elongated rotor member having drive means intermediate of the ends thereof, anti-friction bearing units having inner and outer races and anti-friction members therebetween, the inner races thereof receiving concentrically the opposite ends of said rotatable member, a cylindrical casing surrounding said rotatable member, the end faces of said casing abutting the under faces of said outer races of said bearings to space said bearings a precise determined distance axially, said cartridge assembly being removably mounted operatively within said housing and positionable therein as a unit by insertion thereof through said opening; and means carried by said housing and engagable with said cartridge assembly to secure said outer races of said bearings against said ends of said casing and said cartridge assembly in operative position within said housing.

13. A dental handpiece comprising in combination, a handle having a housing on one end thereof connected thereto and provided with an opening therein; a cartridge assembly comprising a rotatable shaft having drive means intermediate of the ends thereof, anti-friction bearing units having inner and outer races and anti-friction members therebetween, the inner races of said units respectively receiving concentrically the opposite ends of said rotatable shaft, a casing complementary to the interior of said housing and surrounding the drive means of said shaft, the opposite ends of said casing respectively abutting the radial faces of said outer races of said bearing units to space said outer races a precise predetermined distance axially and said cartridge assembly being removably mounted operatively within said housing and positionable therein as a unit by insertion thereof through said opening; and cap means for the opening of said housing releasably secured thereto and having a portion engaging the outer race of the upper bearing unit of said cartridge assembly to secure said outer races of said bearings against said ends of said casing and said cartridge assembly in operative position within said housing when said cap is secured to said housing.

14. The dental handpiece set forth in claim 13 further characterized by the diameter of outer races and exterior of said casing being substantially even and only slightly less than the diameter of the interior of said housing which receives said cartridge assembly, whereby the inner wall of said housing maintains said outer races of said bearing units and casing substantially in axial alignment when said cartridge assembly is mounted within said housing.

15. A dental handpiece comprising in combination a handle having a housing on one end thereof connected thereto and provided with an opening therein; a cartridge assembly comprising an elongated rotatable member having drive means intermediately of the ends thereof, anti-friction bearing units having inner and outer races, the inner races thereof respectively receiving concentrically the opposite ends of said rotatable member, casing means surrounding the drive means of said rotatable member and extending between the outer races of said bearings to maintain the same spaced axially a predetermined distance, said housing engaging outside the outer races to maintain the same coaxial with said casing; said cartridge assembly being removably mounted operatively within said housing and positionable therein as a unit by insertion thereof through said opening; and means engaging said housing and cartridge assembly and operable to secure said cartridge assembly in operative position with said housing.

16. A dental handpiece comprising a tubular handle member having a transverse round housing at its end, said housing having a cylindrical bore communicating with a conduit in said handle, a removable ball bearing cartridge unit slidably mounted in said cylindrical bore, said bore having an annular shoulder at one end, and said bore being internally threaded at its other end, and provided with a cap threaded in said bore, said cap having an annular shoulder on its inner side, and said cap securing the said cartridge unit in said housing, said unit comprising a shaft having drive means intermediate its ends and one end of the housing having an opening about said shaft, a ball bearing assembly at each end of said shaft comprising an outer race with an inner groove, an inner race with an outer groove, and balls in said grooves between said races, the inner races being accurately spaced from each other and having a pressed frictional fit concentrically mounted on said shaft, each outer race being held as a ball bearing assembly with its inner race by the balls between the races, each outer race engaging an annular shoulder in said housing, and the two outer races being accurately spaced from each other by a cylindrical casing surrounding said shaft and its driven means to maintain the outer race grooves accurately spaced from each other axially and opposite the inner race grooves, said housing also engaging concentrically about the cartridge casing and outer races to hold them concentric with each and with the shaft and inner races.

17. A dental handpiece according to claim 16, in which said casing has an opening on one side communicating with said conduit in said handle for passing a driving means.

18. A dental handpiece according to claim 17, in which the drive means on the shaft comprises a bevel gear, and the driving means is a bevel gear carried by a shaft in the handle.

19. A dental handpiece according to claim 17, in which the drive means on the shaft comprises the vanes of a fluid turbine, and the driving means comprises a fluid nozzle fed with fluid through said handle.

20. A dental handpiece of the contra angle type, comprising a tubular handle having a transverse round housing at one end thereof, said housing having a cylindrical bore provided with internal threads at one end and with an annular shoulder at the other end, a tubular shaft rotatably supported in said housing by a pair of ball bearing units located in said bore on opposite sides of an opening communicating with said tubular handle, each ball bearing unit including an inner race, an outer race, and a plurality of balls located in transversely aligned partially circular race grooves, the inner races being concentrically and axially mounted on cylindrical end portions of said shaft, which they frictionally engage, the outer races being spaced from each other and maintained with their race grooves in accurate alignment with the race grooves of the inner races by a cylindrical spacing sleeve between the outer races, and the outer races being concentrically mounted by engagement with the walls of said cylindrical bore and secured in the housing by engaging the annular shoulder at one end of the housing and with a threaded closure at the other end of the housing, clamping the outer races against said spacing sleeve, said sleeve, ball bearing units, and shaft with drive means thereon forming a removable cartridge unit which is removable and replaceable by removing the said threaded closure.

21. In a dental handpiece of the ball bearing type, the combination of a handle having a round transverse head provided with a transverse cylindrical bore and openings at both ends, one end having threads and a threaded member engaging said threads, an annular shoulder in said bore opposite to said threads, a rotatable shaft in said head and projecting from the lower end of the head, a pair of ball bearing assemblies supporting said shaft in said head, said assemblies being located one above and one below, a drive means on said shaft on concentric cylindrical end portions of the shaft, each ball bearing assembly comprising an inner race having an outer partially circular groove, an outer race having an inner partially circular groove, and a plurality of balls in the grooves of each assembly, forming two ball bearing units, said inner races having cylindrical bores with a close concentric fit on the shaft in each case, said outer races having outer cylindrical surfaces concentrically fitted in said housing, cylindrical casing means having plane end surfaces at right angles to the axis of the shaft located between the outer races and accurately spacing the outer race grooves axially from each other, said outer races being secured in fixed position concentric with the shaft and inner races in said housing between said annular shoulder and said threaded member, said ball bearing assemblies and shaft forming a removable and replaceable cartridge unit.

22. In a tool driving and cooling assembly, a tubular handle communicating with a transversely extending, generally cylindrical head housing having a cylindrical bore therein provided with an annular inner shoulder at one end and having internal threads at its other end, one of the ends of said head housing having a threaded cap engaging said threads, and one of the ends having a bore for exposing a shaft, a tubular shaft in said head housing and extending from said bore and rotatably supported in said housing by an upper and a lower ball bearing assembly, each ball bearing assembly including an inner race, and a plurality of balls, said tubular shaft having a cylindrical bore therein for supporting a tool, and having an outer cylindrical surface, each of said inner races having an inner cylindrical surface fitting on said shaft, and having an outer partially circular groove containing said balls, each inner race being concentrically mounted on said shaft, each outer race having an outer cylindrical surface being located in said cylindrical bore in said housing, and each outer race having an inner partially circular groove containing said balls said outer races being accurately spaced in alignment with the inner races, respectively, by a separate cylindrical inner casing having its ends engaged by the inner faces of said outer races, the outer races engaging said annular shoulder in one end of the housing, and being engaged by the threaded member in the other end of the housing, securing the shaft and ball bearing assembly in the housing and forming a removable cartridge unit, said shaft having drive means between said bearing assemblies and said inner casing, and having a lateral aperture communicating with said tubular handle.

23. A dental handpiece comprising a rear bearing housing having an enlarged bore and having an elongated tubular member therein defining a smaller bore and an annular shoulder between said enlarged bore and said smaller bore, an anti-friction bearing comprising an outer race, an inner race, and rolling elements, said outer race being mounted in said enlarged bore against said annular shoulder, threaded means carried by said housing and engaging the other end of said outer race to secure the outer race in said bearing housing, a spindle having an annular shoulder engaging the forward end of said inner race, a drive means fixedly mounted on said spindle, said elongated tubular member carried by said bearing housing and extending forwardly about the spindle but spaced from said spindle, a second anti-friction bearing supporting the forward end of said spindle and comprising a second inner race, a second outer race, and rolling elements, said second outer race being mounted in a through bore, and said second inner race being mounted on the forward end of said spindle.

24. In a tool driving and cooling assembly, a tubular handle communicating with a transversely extending, generally cylindrical head housing having a cylindrical bore therein provided with an annular inner shoulder at one end and having an internally threaded opening at its other end, one of the ends of said head housing having a threaded cap member engaging the threads of said opening, and one of the ends having a bore for exposing a shaft, a cartridge unit removably mounted in said head housing and comprising a tubular shaft in said head housing and extending from said bore and rotatably supported in said housing by an upper and a lower ball bearing assembly, each ball bearing assembly including an inner race, an outer race, and a plurality of balls, said tubular shaft having a cylindrical bore therein for supporting a tool, and having an outer cylindrical surface, each of said inner races having an inner cylindrical surface fitting on said shaft, and having an outer partially circular groove containing said balls, each inner race being concentrically mounted on said shaft, each outer race having an outer cylindrical surface being located in said cylindrical bore in said housing, and each outer race having an inner partially circular groove containing said balls, said outer races being accurately spaced in alignment with the inner races, respectively, by a separate cylindrical inner casing having its ends engaged by the inner faces of said outer races, said inner casing being removably received in the cylindrical bore of said head housing and being removable axially therefrom through said threaded opening when said cap member is detached from said housing, the outer races engaging said annular shoulder in one end of the housing and being engaged by the threaded cap member in the other end of the housing, thereby securing the shaft, inner casing, and ball bearing assemblies in the housing and forming a removable cartridge capable of being removed as a unit from said housing after said cap member has been unthreaded therefrom, said shaft having drive means between said bearing assemblies and within said inner casing, said inner casing having a lateral aperture communicating with said tubular handle, and a source of air under pressure containing lubricant mist and connected to said handle and supplying air and lubricant into said inner casing through said aperture and through both ball bearing assemblies, said housing having an air leakage aperture at the shaft end of the housing for directing a stream of air from said inner casing and housing towards the exposed end of said shaft for cooling a tool held thereby.

References Cited

UNITED STATES PATENTS

| | | | |
|---|---|---|---|
| 2,824,370 | 2/1958 | Page | 32—27 |
| 2,945,299 | 7/1960 | Fritz. | |

FOREIGN PATENTS 560,417    9/1957    Belgium.

LOUIS G. MANCENE, *Primary Examiner.*

ROBERT PESHOCK, *Assistant Examiner.*